Patented Feb. 17, 1925.

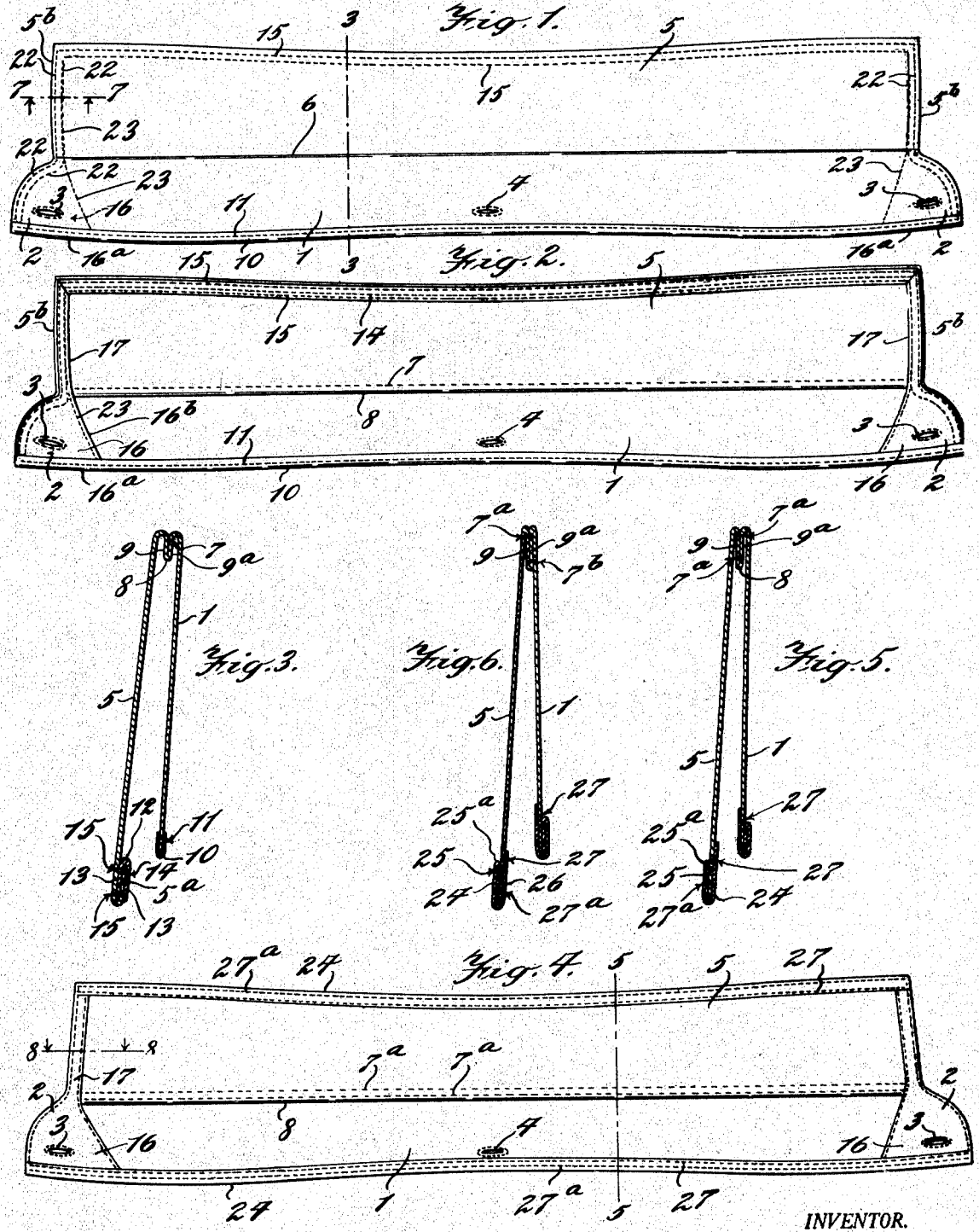

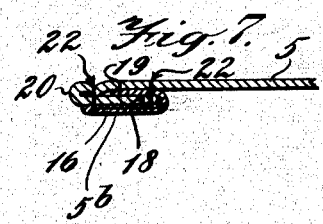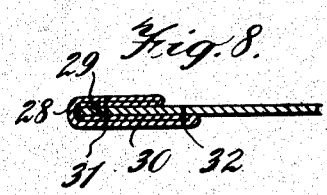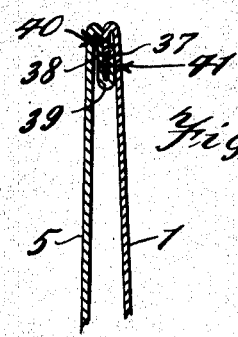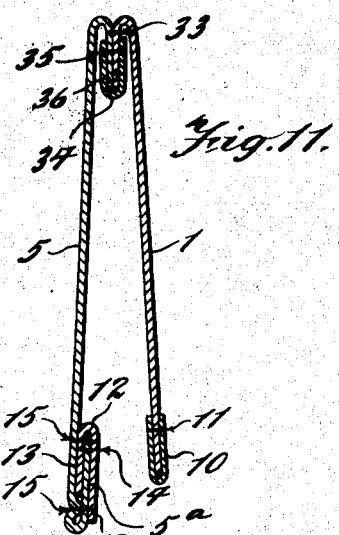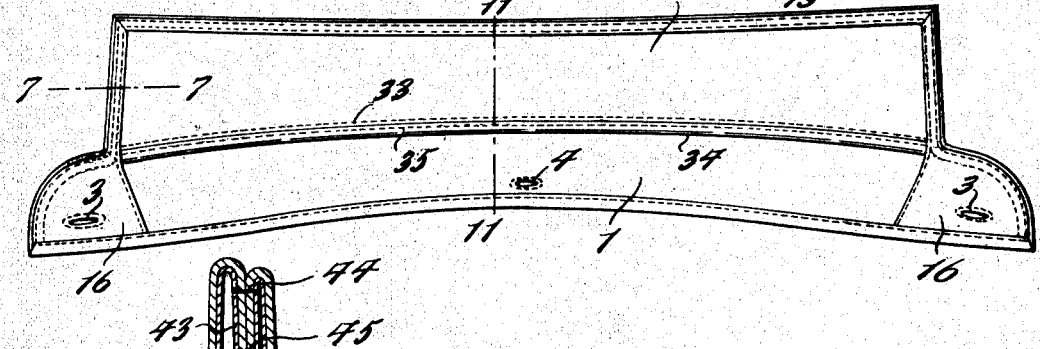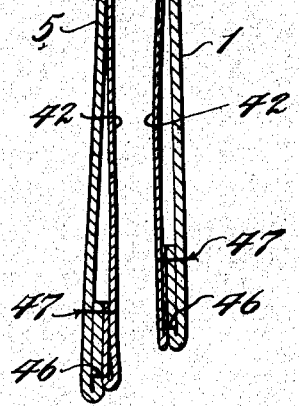

1,526,324

UNITED STATES PATENT OFFICE.

GARRY J. DORMANDY, OF TROY, NEW YORK, ASSIGNOR TO LION COLLARS & SHIRTS, INC., OF TROY, NEW YORK, A CORPORATION OF NEW YORK.

COLLAR.

Application filed December 9, 1921. Serial No. 521,151.

*To all whom it may concern:*

Be it known that I, GARRY J. DORMANDY, a citizen of the United States, residing at Troy, in the county of Rensselaer and State of New York, have invented certain new and useful Improvements in Collars, of which the following is a specification.

My invention relates to new and useful improvements in collars, and more particularly to collars of that character or type known as turn-over collars.

The invention consists in the improvements to be more fully described hereinafter, and the novelty of which will be particularly pointed out and distinctly claimed.

In the accompanying drawings to be taken as a part of this specification, I have clearly illustrated a preferred embodiment, and also certain modified forms of my invention, and in which—

Figure 1 is a plan view of an extended collar made according to my invention, looking at the inside of the neck-band portion and the outside of the turn-over portion;

Fig. 2 is a similar view taken from the opposite side of the collar, that is, showing the outside of the neck-band portion or member and the under side of the turn-over portion or member;

Fig. 3 is a section on the line 3—3 of Fig. 1;

Fig. 4 is a view similar to Fig. 2 of another embodiment of the same invention;

Fig. 5 is a section on the line 5—5 of Fig. 4;

Fig. 6 is a section similar to Fig. 5 of a modification of the form shown in Figs. 4 and 5;

Fig. 7 is a sectional detail view on the line 7—7 of Fig. 1 and Fig. 9;

Fig. 8 is a sectional detail view on the line 8—8 of Fig. 4;

Fig. 9 is a view similar to Figs. 2 and 4 of a further modification;

Figs. 10 and 11 are sections similar to Figs. 3, 5 and 6, and showing further modifications, and Fig. 12 is a view similar to Fig. 5, but in which the turn-over and neck-band members are provided with a lining.

Referring to the drawings by characters of reference, and particularly to Figs. 1, 2 and 3, 1 designates a neck-band member of any suitable design provided with end tabs 2, having buttonholes 3 adapted to be engaged with a stud or button at the front of the neck-band of a shirt upon which the collar is to be worn, said neck-band member also being provided at its central or rear portion with a buttonhole 4 adapted to be engaged with a stud or button at the rear of the neck-band of a shirt. 5 designates the fold-over or turn-over portion or member of the collar which, in the form shown in said Figs. 1, 2 and 3, is preferably integral with the neck-band 1 along a fold line 6 at the upper edge of the neck-band 1, that is, the neck-band member and turn-over member are made of a single piece of fabric. This turn-over member 5 may be of any suitable design or style without departing from the scope of my invention. In order to provide a proper fold at the fold line between the neck-band member and turn-over member, so that the collar will properly fold at the fold line and maintain the desired shape and position when worn, I provide a novel seam or fold between the said neck-band and turn-over members. In the form shown in Figs. 1, 2 and 3, wherein the neck-band and turn-over members are formed from an integral piece of fabric, this fold line is provided by folding the turn-over member over upon the neck-band along the desired fold, so that the outer face of the turn-over member is next the inner face of the neck-band, and a line of stitches 7 is then run lengthwise of the fold line and through the edges of the neck-band and turn-over members at a suitable distance from the closed edge of the fold, this stitch line running preferably the entire length of the fold line 6, whereby a seam or ridge 8 is formed running lengthwise of the collar. When I speak of the outer face of the member 5, I mean the face which is outermost or is exposed when the collar is worn, and the inner face of the member 1, as being the face next the neck of the wearer. It will then be seen that when the turn-over member is turned or folded over upon the neck-band into the position these elements assume when worn, a closed seam or ridge will be provided at the fold line and in the space between the turn-over and neck-band members, this seam consisting of side folds 9, 9ª formed, respectively, of strips of fabric integral with the upper edges of the turn-over and neck-band members. By this construction a definite member is provided along which the turn-over member and neckband member may be folded relative to each other, and thereby assure proper relation of the same when the collar is worn.

The collar shown and above described, and also as shown in the figures to be hereinafter described, may be of any suitable fabric, for example, any of the materials commonly employed in the manufacture of soft turn-over collars, such as heavy linen, duck, percale, and multi-ply fabrics. In making the collar of such material, it is desirable to provide the same with a suitable edge binding or finishing, which may be of any suitable form without departing from the spirit and scope of my invention, but I prefer to employ binding which I will now describe, referring particularly to Figs. 3 and 7 of the drawings:

In the forms shown in Figs. 1, 2 and 3, the binding along the lower edge of the neck-band may consist of a strip or tape 10 overlying the edge, and having its edge portions on the opposite faces of the neck-band and secured thereto by a longitudinal line of stitches 11. The binding for the lower longitudinal edge of the turn-over member may consist of a strip or tape 12 applied to the lower edge of the fabric of the turn-over portion and arranged on opposite sides of the latter, as shown at 13, the parts 13 being first stitched to the edge 5ª of the member 5 by a line of stitches 14, whereupon the edge portion 5ª is turned over upon the inner face of the turn-over member and secured thereto by one or more lines of stitches 15. The stitches 15, it will be seen, pass through all the layers of fabric, both of the turn-over portion and the said binding, and preferably extend lengthwise of the collar throughout the length thereof. In the form shown in Figs. 1 and 2, the end tabs 2 extend beyond the front edges 5ᵇ of the turn-over member, and these tabs as well as said edges are also provided with a suitable binding, preferably such as shown in Fig. 7. This binding consists of a piece of suitable fabric, for example, muslin, including a portion 16 which lies over the outer face of the buttonhole tab and a portion of the neck-band member, as clearly shown in full lines in Fig. 2 and dotted lines in Fig. 1, said portion 16 being provided with a narrow extension 17 (see Fig. 2) which forms the binding for the edge 5ᵇ of the turn-over member. This binding is applied by first laying the same against the outer face of the neck-band and stitching the same thereto by a line of stitches 18 (see Fig. 7) extending lengthwise of the edge 5ᵇ and the end edge of the buttonhole tab 2. The binding is then reversed and its free end 19 folded over upon the opposite face of the turn-over portion and the tab, and the edge of the turn-over portion carrying the binding so arranged is then folded over on a line 20, so that the edge portion 5ᵇ thereof lies parallel to the main portion of the collar on the under face thereof, whereupon lines of stitches 22 are run through the neck-band and turn-over portions lengthwise of the edge, thereby securing the binding portion down upon the under side of the turn-over member and the outer face of the neck-band member. A line of stitches 23 may then be run lengthwise of the rear edge of the part 16 to secure said edge to the neck-band member, and, if desired, this line of stitches 23 may extend through the binding at the edge of the turn-over member (see Fig. 1), although this is not necessary. In the preferred form, the lower binding 10 is preferably arranged so as to overlie the lower edge of the part 16, as indicated at 16ª, and the line of stitches 11 utilized not only to hold the binding 10 in place, but also to hold the lower edge of the part 16. The part 16 is preferably so formed that its rear edge 16ᵇ extends far enough inward on the neck-band so as to be covered by the turn-over member when the collar is worn, as will be clear from Figs. 1 and 2. It will be seen that the turn-over member is provided with a binding which is not visible when the collar is worn, and the buttonhole tabs are provided with a reinforcement which, although on the outside of the neck-band, is sightly and does not detract from the appearance thereof. It will also be seen that by the construction shown and described, I am able to form the end binding for the neck-band, and the reinforce for the buttonhole tab, of an integral piece, whereby the complications of manufacture are simplified. The buttonholes 3 extend through the neck-band and the reenforcements 16, and the stitching for the buttonholes extends through said reenforcements.

In the form shown in Fig. 4 I have shown substantially the same construction as illustrated in Figs. 1, 2 and 3, but have made the fold 8 wider, and in this case may provide the same with two parallel lines of stitches, shown at 7ª, whereby I am able to provide a somewhat more rigid or inflexible ridge at the fold line, but I desire it understood that my invention is not limited to the width of the fold 8 or to the number of rows of stitches employed for securing the members 9, 9ª together. If desired, in the form shown in Fig. 4, the lower line of stitches may pass not only through the members 9, 9ª, but also through the neck-band member, as shown at 7ᵇ. (See Fig. 6.)

In the form of the invention shown in Figs. 4, 5 and 6, I may provide the longitudinal edges of the turn-over member and the neck-band member with a somewhat different binding from that shown in Figs. 1, 2 and 3, the binding being shown clearly in section in Figs. 5 and 6. In this form the binding for both the neck-band and turn-over members is provided by laying a strip or tape 24 of suitable material face to face with the member to which it is attached, and securing the same thereto by a line of stitches 25, whereupon the free portion of the tape is reversed on a fold 25ª and folded over the edge and upon the inner face of the collar member, as at 26, and stitched to the latter by a line of stitches 27 run through the binding and the contacting portions of the collar member in order to secure the binding in place and provide a finished effect. This line of stitches 27 is preferably located close to the fold 25ª, but not passing through the same, as clearly indicated in Figs. 5 and 6. This binding will be found particularly desirable in case it should be desired to starch the collar members, inasmuch as the pressing will flatten out the binding to a point where it approximates the lines of stitches, and will serve to disguise or hide the edge of the binding formed by the fold 25ª. If desired, I may employ an additional line of stitches 27ª, but these latter are not essential and may be omitted. The end binding in this form may be as illustrated in Fig. 8, in which the reinforce 16 for the buttonhole is formed as an extension of the part 17, as heretofore described, but the manner of securing the same to the edge of the collar is somewhat different from that heretofore described. Referring to Fig. 8 it will be noted that the reinforcing fabric 28 is first laid on one face of the collar member and stitched thereto, as at 29, whereupon the binding is doubled upon itself, as at 30, and folded over upon the opposite face of the collar fabric, and parallel lines of stitches 31, 32 provided to secure the binding in place.

In Fig. 9 I have shown another form of the invention in which the neck-band and turn-over members may be of separate pieces of fabric. In this form the upper edge portions of the collar members are cut to give the collar the desired configuration, that is, upon a curve, so as to conform to the neck of the wearer. For this purpose the upper edge of the neck-band is cut on a convex curve and the adjoining or upper edge of the turn-over member on a concave curve to conform thereto. The turn-over member and th neck-band member are then laid with the outer face of the turn-over member against the inner face of the neck-band member, and the curved edges stitched together in alinement by a line of stitches 33 extending lengthwise of the fold. The raw edges may then be covered by a tape binding 34 on opposite sides of the stitched edge portions of the collar members, and secured to said edge portions by a line of stitches 35 extending lengthwise of the collar. The turn-over member may then be folded over into position to be worn, whereupon it will be seen that a seam or fold member is provided in the space between the turn-over and neck-band members, this fold or seam comprising edge portions 36 of the said collar members, and the binding 34 enveloping said parts 36. (See Fig. 11).

In Fig. 10 I have shown a modified form in which the collar members are formed of separate pieces of fabric which are joined by providing the neck-band member with an inturned fold 37 and the turn-over member with an inturned part 38, the lower edge of which is reversed upon itself, as at 39, to receive and envelope the part 37. In this case the parts 37, 38 are connected by a line of stitches 40 corresponding to the line of stitches 33, shown in Fig. 11; and I also employ a line of stitches 41 extending through the edge portions of the parts 38 and 37 and the part 39 which encloses the part 37.

While I have shown the invention and described the same hereinbefore as being applied to an unlined collar, it may, with equal facility, be applied to a collar having a lining, such form being shown in Fig. 12, in which the fold member may, if desired, be the same as that shown in Fig. 6, and a lining 42 is employed which overlies the inner face of the turn-over member and the outer face of the neck-band, as well as passing around the fold member, as shown at 43, and being stitched to the latter by one or more rows of stitches 44, 45. In this form of the invention it will be understood that the lining is first applied to the collar members and stitched thereto at the longitudinal margins in any suitable manner, as at 46, so as to form a proper edge finish, and the collar is then turned so as to bring the proper faces of the neck-band portion and turn-over portion outermost, whereupon additional marginal stitches 47 may be applied. The inner face of the neck-band is then folded over along the desired fold line upon the outer face of the turn-over portion, whereupon the stitches 44, 45 are applied. The collar members are then turned over to the position shown in Fig. 12, in which position the collar is adapted to be worn.

While I have shown herein several forms of bindings for the edges of the collar members, I desire it understood that I do not limit myself to such bindings, but may employ any suitable binding for the purpose, and, further, that the bindings shown may be used interchangeably without departing from the spirit and scope of my invention.

What I claim and desire to secure by Letters Patent of the United States is:—

1. A collar comprising a neck-band member and a turn-over member each having an inturned edge fold at its upper portion, said folds being located in the space between said members, and being secured together adjacent to the folds, said members and inturned edges being formed of a single piece of fabric.

2. A collar comprising a neck-band member and a turn-over member each having an inturned edge fold at its upper portion, said folds being located in the space between said members, and being stitched together by stitches extending lengthwise of said folds adjacent to the folds, said members and inturned edges being formed of a single piece of fabric.

3. A collar comprising a neck-band member and a turn-over member, the neck-band member having a buttonhole tab, and a binding for the end edge of said turn-over member, said binding having an integral part covering and stitched to the buttonhole tab.

4. A collar comprising a neck-band member and a turn-over member, the neck-band member having a buttonhole tab, and a binding for the end edge of said turn-over member, said binding having an integral enlarged part covering and stitched to the buttonhole tab.

5. A collar comprising a neck-band member and a turn-over member, the neck-band member having a buttonhole tab and a binding for the end edge of said turn-over member, said binding having an integral enlarged part covering and stitched to the buttonhole tab, and a binding for the lower edge of the neck-band member, said latter binding overlying the lower edge of said enlarged part, and a line of stitches through the overlying binding, said enlarged part and the neckband member.

6. A collar comprising a neck-band member and a turn-over member, the neck-band member having an end buttonhole, and a binding for the end edge of the turn-over member, said binding having an integral part overlying and stitched to the area of the neck-band enclosing said buttonhole.

7. A fold-collar having a band and a folded-over top each with its intermediate portion formed of an integral piece of fabric, said top and band being stitched together adjacent to the fold-line of the collar, having the inner edge of the top inturned upon the outer side of the band, and having a welt on the outer side of the band extending along the fold-line and formed by said inturned portion of the inner edge of the top, and folded portions of the inner edge of the band, stitched together.

8. A fold-collar having a band and a folded-over top each, with its intermediate portion formed of an integral piece of fabric, said top and band being stitched together adjacent to the fold-line of the collar, having the inner edge of the top inturned upon the outer side of the band, and having a welt on the outer side of the band extending along the fold-line and formed by said inturned portion of the inner edge of the top, and folded portions of the inner edge of the band stitched together, and having facings covering the end-portions of the band exposed to view in use, and the neighboring corner-portions of the top.

9. A fold-collar the body portion of which comprises a band and a folded-over top formed of a continuous piece of fabric with inturned end edges, and having a continuous facing strip extending transversely of the band and top at an end of the collar covering the outer surface of the end of the band and the inner surface of the neighboring end of the top, the edge of said facing strip being inturned and stitched to the inturned end edges of the band and top in two parallel rows.

In testimony whereof I have hereunto signed my name in the presence of two subscribing witnesses.

GARRY J. DORMANDY.

Witnesses:
H. L. BRYANT,
H. M. LABRUM.